No. 724,850. PATENTED APR. 7, 1903.
J. T. T. GRIM.
DOVETAILING MACHINE.
APPLICATION FILED OCT. 25, 1902.
NO MODEL. 6 SHEETS—SHEET 1.

WITNESSES:
INVENTOR
John T. T. Grim
BY
ATTORNEYS.

No. 724,850. PATENTED APR. 7, 1903.
J. T. T. GRIM.
DOVETAILING MACHINE.
APPLICATION FILED OCT. 25, 1902.
NO MODEL. 6 SHEETS—SHEET 2.

WITNESSES:

INVENTOR
John T. T. Grim
BY
ATTORNEYS.

No. 724,850. PATENTED APR. 7, 1903.
J. T. T. GRIM.
DOVETAILING MACHINE.
APPLICATION FILED OCT. 25, 1902.

NO MODEL. 6 SHEETS—SHEET 3.

Fig. 3.

WITNESSES:

INVENTOR
John T. T. Grim
BY
ATTORNEYS.

No. 724,850. PATENTED APR. 7, 1903.
J. T. T. GRIM.
DOVETAILING MACHINE.
APPLICATION FILED OCT. 25, 1902.
NO MODEL. 6 SHEETS—SHEET 4.

WITNESSES:
INVENTOR
John T. T. Grim
BY
ATTORNEYS.

No. 724,850. PATENTED APR. 7, 1903.
J. T. T. GRIM.
DOVETAILING MACHINE.
APPLICATION FILED OCT. 25, 1902.
NO MODEL. 6 SHEETS—SHEET 5.

WITNESSES:
Joshua Bergstrom
R. B. Cavanagh

INVENTOR
John T. T. Grim
BY
ATTORNEYS.

No. 724,850. PATENTED APR. 7, 1903.
J. T. T. GRIM.
DOVETAILING MACHINE.
APPLICATION FILED OCT. 25, 1902.
NO MODEL. 6 SHEETS—SHEET 6.

WITNESSES:

INVENTOR
John T. T. Grim
BY
ATTORNEYS.

UNITED STATES PATENT OFFICE.

JOHN TRUMAN TAYLOR GRIM, OF CUMBERLAND, MARYLAND.

DOVETAILING-MACHINE.

SPECIFICATION forming part of Letters Patent No. 724,850, dated April 7, 1903.

Application filed October 25, 1902. Serial No. 128,773. (No model.)

*To all whom it may concern:*

Be it known that I, JOHN TRUMAN TAYLOR GRIM, a citizen of the United States, and a resident of Cumberland, in the county of Allegany and State of Maryland, have invented a new and useful Improvement in Dovetailing-Machines, of which the following is a full, clear, and exact description.

This invention relates to certain novel and useful improvements in automatic dovetailing-machines.

It is the intention of the present invention to provide a machine which is automatic or self-feeding, it only being necessary for the operator to place the stock or material on the bed so the lugs on the conveying-chains may engage the same, and when power is applied through a train of power-transmitting devices the material will be moved properly relative to a suitably-shaped rapidly-revolving cutter-die and the mortises and tenons cut as desired without further attention on the part of the operator.

A further object of the invention is to so construct the work retaining or holding attachments that two pieces of material may be held therein contiguous to each other, one vertically and the other horizontally, whereby the rapidly-revolving cutter die or bit will simultaneously cut pins or tenons in one piece and grooves or mortises in the other.

A further advantage incident to the stock-retaining attachment is that no levers, screws, or like means are necessary to hold the material in proper position, as the pressure exerted by the bars of the attachment is sufficient for this purpose.

I also have in contemplation the production of a machine the cutting-bits of which are so mounted that they may be readily removed and others substituted, the bearing-boxes for the shafts or spindles of the cutter-bits being so constructed as to take up all wear or play, such boxes being also employed to adjust the cutters vertically.

Another object is to provide means for clamping and feeding pieces of stock or work commonly known as "half-swells" and generally used for making the front sections of bureau-drawers and the like. Owing to the peculiar shape of the half-swells, it is impossible to insert such in the machine in the ordinary manner and obtain satisfactory results; but I have devised means, auxiliary and supplemental to the main clamping and feeding devices, for accomplishing this purpose.

Finally, it is also the object of the invention to devise and construct a machine which shall be durable in construction and embody simplicity and effectiveness of operation and capable of being manufactured at comparatively small expense.

With these and other objects of a similar nature in view the invention consists in the peculiar construction, combination, and arrangement of parts, as will be hereinafter fully described in this specification, illustrated in the accompanying drawings, and set forth in the appended claims.

While I have herein illustrated and described one form or embodiment of my invention, it will of course be understood that I do not wish to limit myself to the precise details thereof, as there can be changes and modifications in some respects without departing from the spirit of the invention or sacrificing any of the advantages thereof.

Reference is to be had to the accompanying drawings, forming a part of this specification, in which similar characters of reference indicate corresponding parts in all the figures.

Fig. 7 is a view similar to Fig. 5, but showing the means employed for supporting short irregularly-shaped sections of material, such as used for making the fronts of bureau-drawers and the like.

Figure 4:
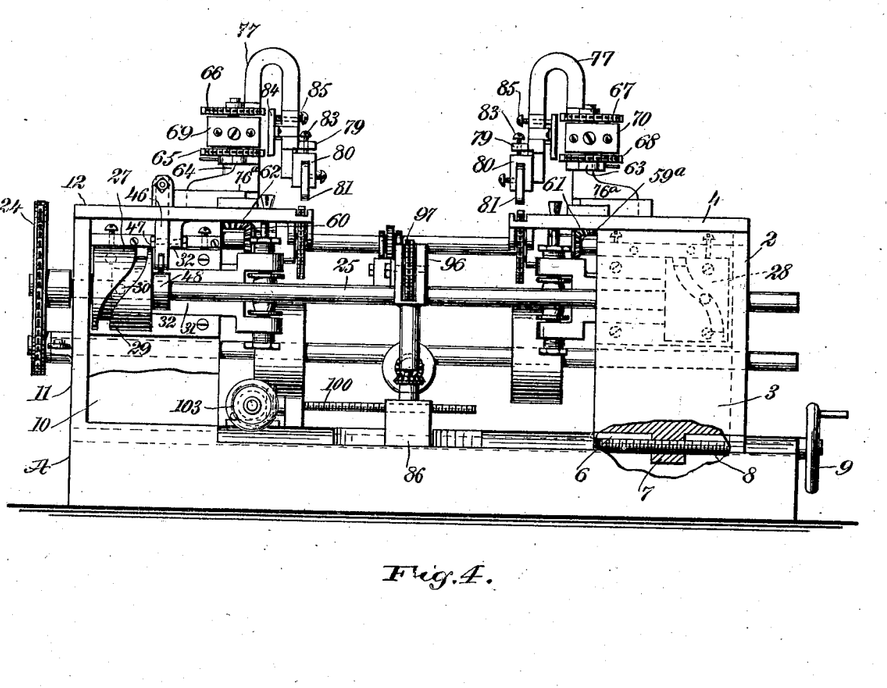
Fig. 4 is a rear view of the machine, a portion of the framework being removed.

Referring now to the drawings in detail, the letter A designates the base portion of the framework of my machine, which may be mounted in any desired manner at a convenient place. Extending entirely across this base portion is a dovetailed projecting strip or bar 1, which may be formed integral with the base or, if desired, may be a bar attached thereto. Upon the base is mounted a frame or box-like structure composed of the vertical side and rear walls 2 and 3 and the top or table-like portion 4. The base 5 of the frame or box portion is recessed or grooved to receive the dovetailed projecting bar 1 in such manner that said box or frame may slide or move along the base toward and from the center of the machine, with the aforesaid bar 1 as a retaining and guiding means. A longitudinal groove, as shown at 6, is formed in the projecting bar 1, and into this groove is fitted an apertured projection or lug 7, formed on the base of the frame or box-like structure above referred to. A relatively long screw-rod 8, adapted to be turned by a wheel 9, lies in the said groove and extending through the aperture in the depending lug 7 of the base of the frame or box causes the said box portion and the parts supported thereby to move toward and away from the center of the base, according to the direction of the revolution of the screw-rod. This is clearly shown in Fig. 4. A second framework or box-like structure similar to the above-mentioned one, but rigid with the base portion, is erected at the opposite end of the said base. As will be seen in Fig. 4, this stationary frame or box is formed of the vertical rear and side walls 10 and 11, respectively, and the top portion 12.

Secured to the front of the aforesaid frames or boxes in any desired manner are the forwardly-extending brackets or arms 13 and 14, supporting at their outer ends the horizontally-disposed counter-shaft 15. If desired, the counter-shaft may be further supported by means of upright standards, as shown at 16.

Figure 3:
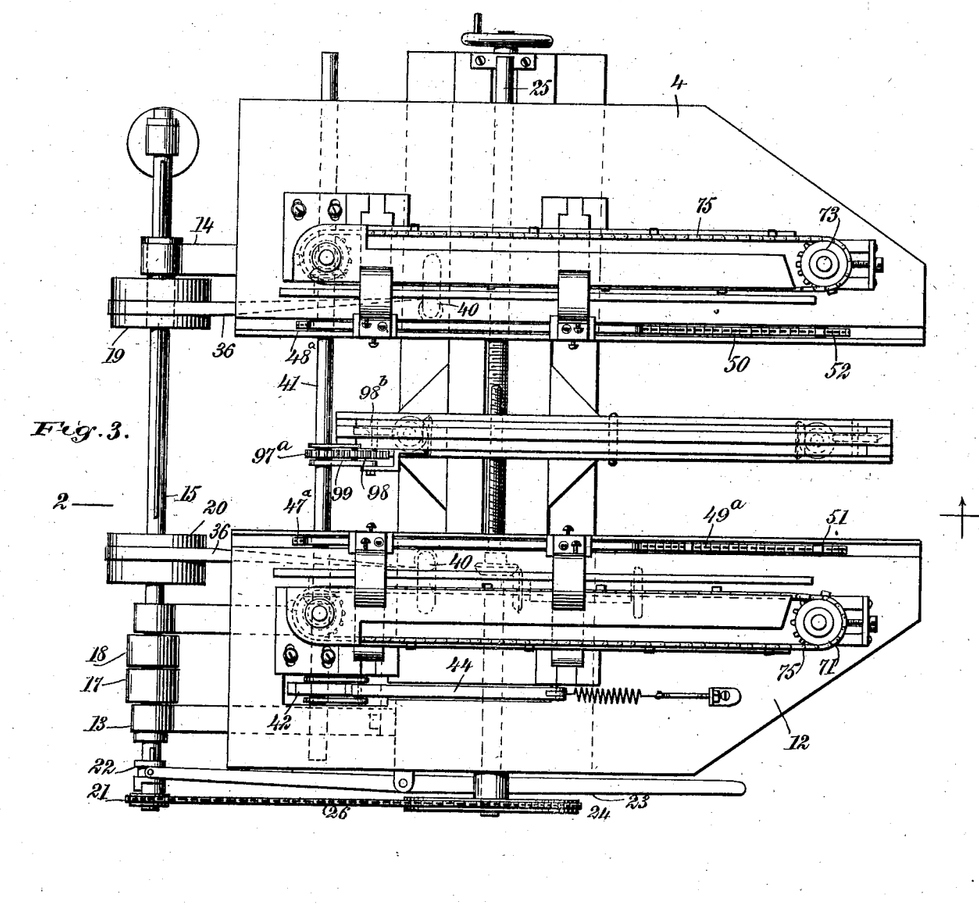
Fig. 3 is a top plan view of the machine embodying my improvements.

As will be seen by reference to Fig. 3, the shaft 15 has mounted thereon two ordinary belt-pulleys 17 and 18, and said shaft has also rigidly mounted thereon, so as to rotate therewith, the two comparatively large belt-pulleys 19 and 20, designed for a purpose to be hereinafter mentioned.

Figure 8:
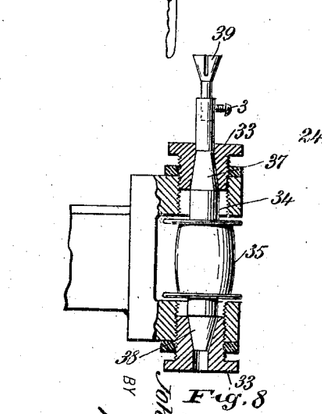
Fig. 8 is a detail view, partly in section, of the bracket and bearing-box employed for supporting the cutting-bits, a bit and its supporting-shaft being shown in elevation.

Near one end of the shaft 15 is revolubly mounted a sprocket clutch member 21, which clutch member, owing to its being loose upon the shaft, is normally stationary when said counter-shaft is revolving, but when engaged by a corresponding clutch member 22, slidably mounted on and rotatable with the aforesaid shaft 15 and designed to be shifted into engagement with the sprocket clutch member 21 by means of the lever 23, pivoted to the framework of the machine, the sprocket clutch member 21 will turn with the shaft and through the medium of the endless chain 26 will drive the sprocket 24, rigidly connected with the turning shaft 25. As will be seen by reference to Fig. 4 in particular, this shaft 25 is journaled in the framework of the box structures above referred to and extends horizontally the entire length of the machine. Rigidly mounted at each end of the said shaft, adjacent to the interior surfaces of the side walls 2 and 11, are the wheel-pulleys 27 and 28, each being provided along its exterior face with an eccentrically-arranged cam-groove 29. A horizontally-disposed bifurcated bracket or arm 31 is slidably mounted between guideways or bars 32 32 in each of the two frame portions heretofore referred to, and at the shank portion of each of said brackets is carried a pintle or stud 30, adapted to be seated in the cam-groove of the respective adjacent pulley-wheels. The jaws forming the bifurcated portion of these arms are centrally apertured and preferably screw-threaded, as will be clearly seen by reference to Fig. 8, wherein I have shown the arrangement and mounting of the parts of one of the cutter mechanisms. These apertures are designed to receive the screw-threaded glands or caps 33 33, which are centrally vertically bored to permit the passage of the vertically-arranged cutter-bit-carrying spindle 34. On that portion of the spindle lying between the jaws of the bifurcated bracket is mounted the spindle 35, adapted to form a pulley or bearing for the quarter-belt 36, driven from the counter-shaft 15. The vertical bores in the arms of the spindle-bracket are frusto-conical in shape to form bearings or seats for the tapered portions 37 and 38 of the cutter-spindle. This arrangement permits any wear or play caused by the friction of the spindle on the side walls of the interior of the gland to be remedied by adjusting said gland through the medium of the screw-thread. A cutter-bit, as at 39, is socketed in the upper end of the spindle, the cutting portion of said bit extending through an elongated slot, as at 40, cut in the top portion of the framework or box structure. As will be seen by reference to the drawings, this arrangement of the bifurcated sliding arm, cutter-bit, and other parts is duplicated in the machine shown herein.

By the above-described arrangement it will be further observed that when the countershaft is turned through the medium of power applied thereto from any suitable source the bit-spindles will be revolved through the agency of the wheel-pulleys 19 and 20 driving the quarter-belts encircling the spools of the bit-spindles. Under these circumstances, assuming the clutch members 21 and 22 to be in their disengaged position, the cutter-bit spindle will have only a rotating movement imparted thereto; but on connecting the clutch members as hereinbefore described the sprocket-wheel 24 and the shaft 25 will be revolved, causing the turning of the cam-grooved pulleys 27 and 28, mounted on the said shaft, thus imparting to the bifurcated bracket and carrying-arm a reciprocating movement and causing the cutting-bit to move back and forth in the elongated slot, the cutter therefore having a continuous rotary and a reciprocating movement imparted thereto simultaneously.

So far the above description has pertained mainly to the manner of construction and the method of operating the dovetail-cutting devices, and I will now proceed to describe in detail the means employed for leading the stock or work to the cutters.

Figure 12:
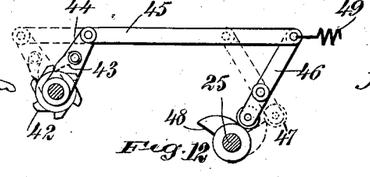
Fig. 12 is a detail view of the ratchet-and-lever mechanism for actuating the stock-conveying means.
Figure 13:
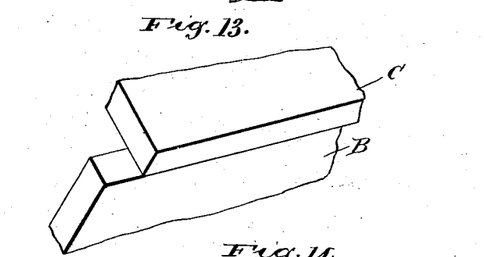
Fig. 13 is a detail perspective view showing the positions which two pieces of material occupy relative to each other when in the machine.
Figure 14:
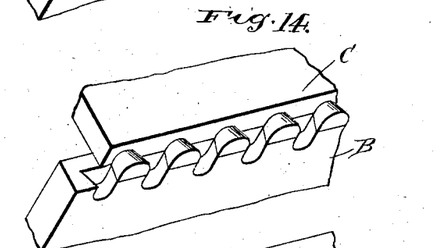
Figs. 14 and 15 are detail perspective views of mortise-and-tenon joints as formed by my machine.
Figure 15:
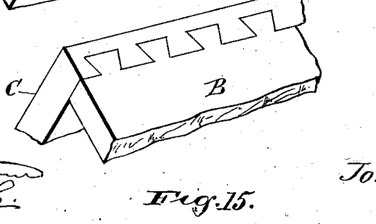
Figure 16:
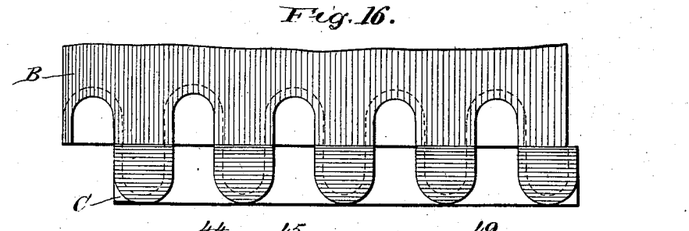
Fig. 16 is a horizontal and sectional view of an end of a dovetail drawer-front and one side of the same in the relative positions they occupy when held in the clamping-bars, but inverted.

Revolubly journaled beneath the top portions 4 and 12 of the box structure at the front of the machine is a horizontally-disposed shaft 41, which for the sake of convenience and clearness I shall hereinafter term the "conveyer-shaft." This conveyer-shaft has imparted to it an intermittent rotary motion through the medium of the following mechanism: On the shaft, a short distance from the end thereof, is rigidly mounted a ratchet-wheel, as at 42, the teeth on the periphery of said wheel passing through a longitudinal slot formed in the top portion 12, parallel with its outer edge. An intermittent or step-by-step motion is imparted to this wheel by the pawl 43, carried by the link 44, which link is connected by a lever 45 with a second link or rod 46, carrying at its lower free end a roller 47, adapted to be normally held in contact with the surface of a cam 48, mounted on the shaft 25, by means of the tension-spring 49. This arrangement of parts is clearly illustrated in detail in Fig. 12. As will be seen, the lever 45 and its accompanying parts are reciprocated back and forth in the slot by the action of the toe of the cam forcing the link 46 outward against the tension of the spring 49, and when the link 46 has been passed by the toe of the cam the spring will retract the lever and cause the pawl 43 to engage another tooth on the rack 42. On the conveyer-shaft at a point preferably beneath the inner ends of the top portions are mounted the sprocket wheels or disks 47ª and 48ª, adapted to act as supports and motion-transmitting means for the endless conveyer-chains 49ª and 50, which chains also extend around similar rotatable sprocket-disks 51 and 52. As will be seen on reference to Fig. 3, these chains lie in longitudinal slots adjacent to the inner edges of the said top portions.

Figures 1, 9:
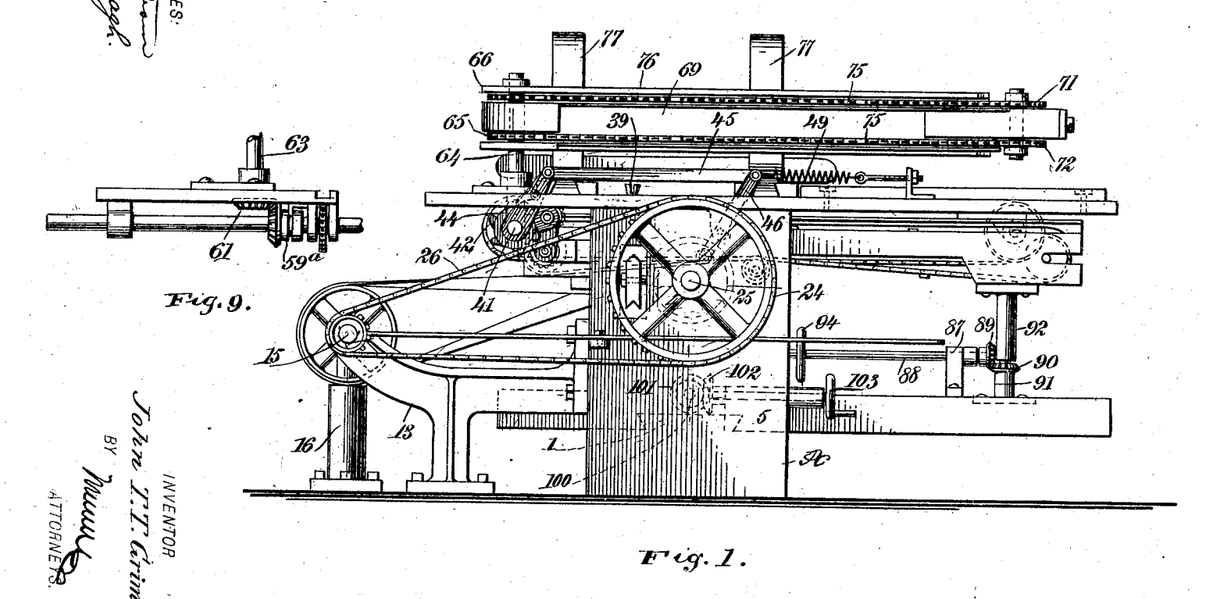
Figure 1 is a side elevation of a mechanism embodying my improvements, showing the mounting of the power-transmitting devices and the means for actuating the stock carrying or conveying chains.
Fig. 9 is a detail view showing the arrangement of the shaft and gearing for transmitting motion to the stock carrying or conveyer chains.
Figures 2, 10, 11:
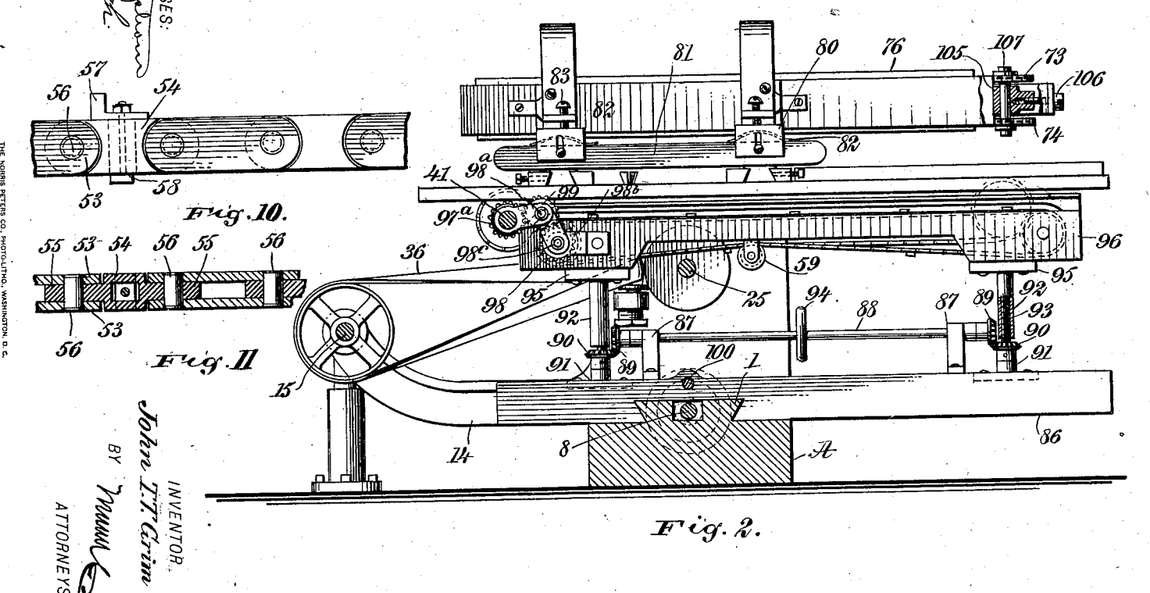
Fig. 2 is a central vertical section taken transversely through the machine on the line 2 2 in Fig. 3 and showing the supplemental frame in side elevation.
Fig. 10 is a side view of a portion of my preferred form of carrying or conveyer chain.
Fig. 11 is a horizontal sectional view of the same.

The conveyer-chains used in my improved machine are preferably constructed as shown in Figs. 10 and 11—that is to say, with the two outside link-faces 53 53, a second member 54, having a centrally-apertured rectangular middle portion, and laterally-extending lugs 55 55, said lugs being disposed between the parallel faces 53 53 and secured thereto by a link-pintle, as at 56. Within the apertured portion of the part 54 is secured a lug or projection 57, held in place by means of a bolt and nut 58. These lugs are placed suitable distances apart on the chain and are designed to engage the surfaces of the work or stock as it is being conveyed through the machine by the aforesaid chains. Roller-bearings, as at 59, may be journaled beneath the central portion of the top frames to act as supports for the chains and prevent them sagging. On the outer portion of said conveyer-shaft and adjacent to the said sprocket-disks 47ª 48ª are the collars 59ª and 60, each having a bevel-gear at one edge. These bevel-gears, as will be clearly seen in Fig. 9, mesh with corresponding bevel-gears 61 and 62, carried by upright shafts 63 64, which extend up through the top portions 4 and 12 of the frame and are revolved through the motion transmitted through the intermeshing gears just described.

Carried by the upper portions of the shafts 63 64 are horizontally-disposed sprocket-wheels 65 66 and 67 68, preferably two for each shaft, as shown, the space between the sprockets on each shaft being occupied by horizontally-disposed bars 69 and 70. At the rear end of each of the bars 69 and 70 are arranged similar pairs of sprocket-wheels 71 72 and 73 74. Each pair of sprocket-wheels just referred to, which lie in the same horizontal plane, is encircled by an endless chain 75, similar in structure to the chain hereinbefore described and provided with similar projections or lugs.

Strips 76, of any suitable material, such as wood or metal, extend over these chains their entire length, thus serving as a means for preventing the chains from becoming clogged by dirt or other foreign matter. If desired, the horizontal chains and the bars just described may be further supported on the top of the portions 4 and 12 by means of suitable brackets, as shown at 76ª. To the top of these strips 76 are secured a suitable number of upwardly-extending inverted-U-shaped arms 77, which are the stationary members or supports for the pressure or clamping bars hereinafter described. On the outer face of the inner portion of each inverted-U-shaped arm is formed a seat or extension 79, and beneath said extension the member is cut away in such manner as to form a tongue extending through a slot formed in a block 80, so that the latter is adjusted vertically a short distance on said arm. The under faces of these blocks are in turn grooved longitudinally to receive and support the pressure-bar 81, as clearly shown in Fig. 2. The bar 81 is in turn adjustable relative to the block 80 by means of screw-pins secured to said bar and passing through the vertical slot formed in said block. Between the top of the bar 81 and the top wall, forming a groove in the block, is interposed a spring-clip, as shown at 82, (see Fig. 2,) for the purpose of giving to the bar a spring pressure or tension. The block is in turn adjustable relative to the inverted-U-shaped arm by means of a set-screw 83, extending through the seat on the arm and bearing in said block. Generally there are two such inverted-U-shaped arms for supporting each of the pressure-bars 81, and it is of course to be understood that the arrangement of parts just described is carried out in each block or arm employed.

Figure 5:
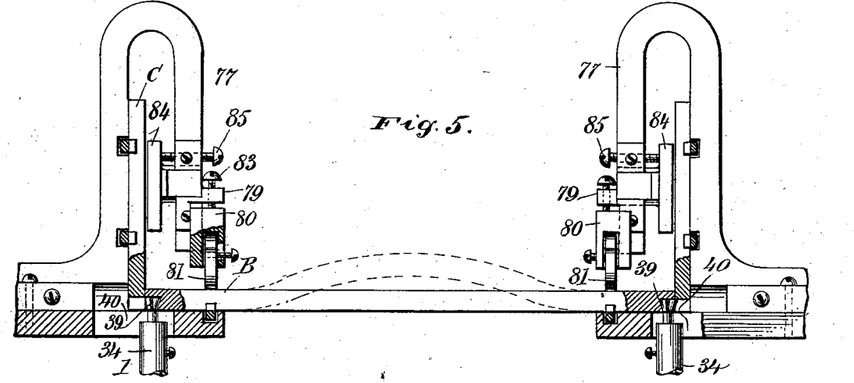
Fig. 5 is an end view, partly in elevation and partly in section, of a portion of the table or bed of the machine and the adjustable pressure or clamping bars mounted thereon, said view also illustrating the manner of retaining the stock in position when subjected to the action of the cutter-bits.
Figure 6:
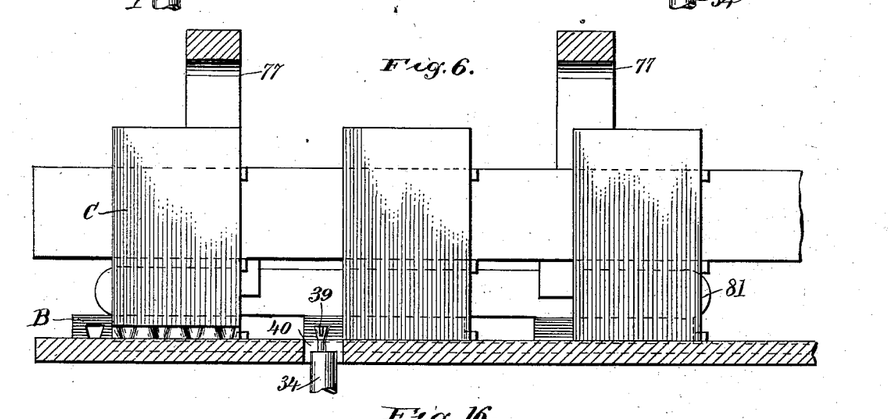
Fig. 6 is a longitudinal vertical sectional view of the parts shown in Fig. 5, taken substantially on the line $x\,x$ of Fig. 5.
Figure 7:
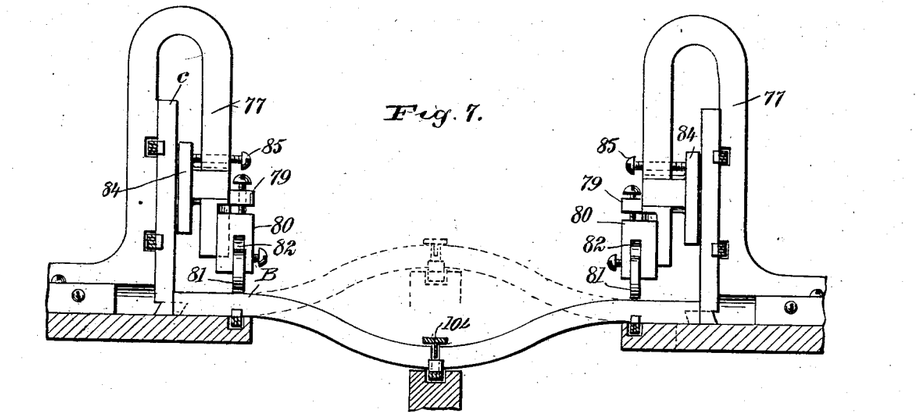

The bar 81 and its accompanying parts just described are employed for the purpose of retaining the end of the piece of material employed for making the top of an article, such as a bureau-drawer, the position of the material being clearly shown in Figs. 5 and 7, such top piece being designated by the letter B; but to retain the stock C employed for making the side portion of the box or drawer a horizontally-disposed pressure-bar 84 is adjustably mounted on the two parallel U-shaped arms lying in the same longitudinal planes on the machine by means of set-screws, such as shown at 85. By means of this bar pressure on the stock, which is held vertically in the machine, may be as heavy or as light as desired.

The above construction of machine is designed for use particularly when the stock to be worked on is straight—that is, stock having no irregularly-shaped surfaces—and if it be desired to dovetail such an irregular piece of work, such as the swelled or curved front of a bureau-drawer or the like, it is necessary to provide a means for holding said front while the edges are being acted on by the guide-cutters, and to accomplish this purpose I have devised the following mechanism: Extending transversely of the base portion of the machine and rigidly secured thereto is a bar 86, provided with suitable bearing-blocks 87 87. Resting in these bearing-blocks and extending transversely beneath the central portion of the machine is a shaft 88, carrying at each end a vertically-disposed bevel-gear 89, each of such bevel-gears being adapted to mesh with a corresponding bevel-gear 90, which is horizontally disposed and revolubly supported on the vertical tubular shafts 91 92. Each upper section or tubular shaft 92 has its interior portion screw-threaded to receive a screw-shank 93, rigidly connected with each of the aforesaid bevel-gears 90. A hand-wheel, as at 94, is mounted at the central portion of the shaft 88 for the purpose of turning said shaft and imparting motion to the bevel-gears. The upper end of each of the tubular shaft portions 92 is enlarged to form a supporting portion 95. These portions are designed to support the parallel bars 96, supporting and carrying a conveyer-chain 97, similar in construction to the chains hereinbefore described. In order to permit motion to be imparted to the conveyer carried by the said bars, a gear-wheel 97$^a$ is mounted centrally of the conveyer-shaft 41 and when turned by said shaft imparts motion to a second gear-wheel 98, mounted on a shaft 98$^c$, through an intermediate gear-wheel 99, mounted on a shaft 98$^a$, there being rigidly mounted on the shaft 98$^c$ a sprocket-wheel 98$^b$, carrying one end of the conveyer-chain. Thus when the conveyer-shaft is revolved motion will be imparted through this train of gearing to the sprocket-wheel 98$^b$, and consequently to the chain, and it will move in unison with the conveyer-chains arranged on each side thereof. The entire half-swell attachment may be moved on the central portion or base of the machine through the medium of a screw-rod 100, carrying at one end a bevel-gear 101, meshing with a corresponding bevel-gear 102, which latter bevel-gear is actuated through a shaft and wheel 103. When these devices are put into operation, the central attachment may be slid along the machine in a manner similar to that of the movable section or frame. It will further be observed that this central attachment in addition to being shifted along the length of the machine may be raised or lowered through the mechanism hereinbefore described, as desired, according to whether it is in or out of use. Indeed, if necessary or convenient, the entire attachment may be removed from the machine.

To retain the ends of short pieces of work or half-swell portions in place while subjected to the action of the cutter-bits, a T-shaped guide, as at 104, holds the contiguous or adjacent ends of the material, which rest upon the central auxiliary attachment hereinbefore described, securely in place, and these T-shaped guides have a groove formed at their lower portions for the passage of the conveyer-chains.

For the purpose of adjusting or taking up the slack of the chains 75, mounted on the rear horizontally-arranged sprocket-wheels 71, 72, 73, and 74 on the top of the frames, I have interposed in the slot in the rear of the bars 69 and 70 bearing-blocks, as at 105, which blocks are horizontally adjustable through means of the set-screws 106. A shaft, as at 107, extends through each of said sliding or adjustable blocks, and the aforesaid sprocket-wheels are mounted at the extremities of these shafts. By means of the set-screws it will be readily observed that the blocks can be shifted back or forth in the aforesaid slots and the chain thus loosened or tightened, as desired.

From the above description, taken in connection with the accompanying drawings, the operation of the machine will be evident. The stock or work is fastened in the machine by means of the clamping or pressure bars in the manner shown in Figs. 5 and 7. The members of the clutch members on the counter-shaft are then connected and power is imparted to said shaft to revolve the same. This revolution of the shaft will impart motion by the large chain and sprocket-wheel at the side of the machine to the shaft 25, extending therethrough. The cam-wheels 27 and 28, as heretofore described, will reciprocate the continuously-revolving cutter-bits back and forth in their respective slots, and the cam 48 will trip the lever and rack mechanism, as described, for the purpose of imparting motion to the conveyer-shaft. The conveyer-chains, which receive motion from the aforesaid conveyer-shaft through the means heretofore described in detail, will then carry the stock or work through the machine in the path of the rapidly-rotating cutter-bits, such work being held or retained by the pressure-bars and the lugs on the chain. The action of the cutting-bit upon the work will be readily understood by reference to Figs. 5, 6, 7, and 15.

On an examination of the pressure-bars it will be noted that they are slightly curved or beveled at the ends thereof. Owing to this conformation, as the work or stock is carried by the conveyer-chains into the path of the cutting-bit the maximum pressure of the bars will be exerted upon such work only while the cutters are acting upon the same. The purpose of this is to relieve the machine of any continued unnecessary strain or pressure by the bars upon portions of the work which are not immediately adjacent to the cutters, the entire strain being exerted by the central portion of the pressure-bars upon the work immediately in the path of the cutter. For example, when the stock enters the machine there is no pressure, and when the stock is about six inches from the cutting-bit then such pressure is exerted and continues until the stock has been dovetailed or cut.

The many advantages incident to my improved mechanism aside from those heretofore described will be clearly evident, so that it is unnecessary to dwell upon the same in detail here.

Having thus described my invention, I claim as new and desire to secure by Letters Patent—

1. In a dovetailing-machine, a base portion, a stationary frame, and a movable frame on the base portion, conveying means carried by said frames, and a supplemental frame supporting additional conveying means interposed between the movable frame and the stationary frame, substantially as set forth.

2. In a dovetailing-machine, a base portion, a stationary frame and a movable frame mounted on said base portion, clamping devices carried by said frames, conveying means mounted on said frames adjacent to the clamping devices, cutting mechanism supported in the frames, and supplemental clamping and conveying means interposed between the movable frame and the stationary frame, substantially as set forth.

3. In a dovetailing-machine, a base portion, frames mounted thereon, clamping and conveying devices carried by said frames, a horizontally-movable and vertically-adjustable supplemental conveyer mounted adjacent to said frames, cutting mechanism slidably supported adjacent to clamping and conveying devices, a counter-shaft, and power-transmitting devices actuated from said shaft for imparting motion to the cutting mechanism, the conveying devices and to the supplemental conveyer, substantially as set forth.

4. A dovetailing-machine, comprising a base portion, frames mounted thereon, clamping devices and conveying means carried by said frames, cutting mechanisms supported in said frames, a counter-shaft, power-transmitting devices connected with the counter-shaft, for imparting motion to the cutting mechanisms, and a spring-tensioned pawl-carrying lever mechanism actuated by the rotation of the counter-shaft for imparting motion to the conveying means.

5. A dovetailing-machine, comprising a base portion, frames mounted thereon, clamping devices and conveying means carried by said frames, cutting mechanisms mounted in said frames, a counter-shaft, means for transmitting power from the counter-shaft to the cutting mechanisms for rotating the latter, a clutch mechanism comprising two members, one loose on the counter-shaft, the other slidably mounted on said shaft, and motion-imparting devices interposed between the clutch member loose on the shaft and conveying means, whereby when the sliding member of the clutch is shifted into engagement with the loose member, the conveying devices will be actuated simultaneously with the movement of the cutting mechanisms, substantially as set forth.

6. A dovetailing-machine, comprising a base portion, frames spaced apart and mounted thereon, clamping devices and conveying means carried by said frames, cutting mechanisms slidably and rotatably mounted in said frames, power-transmitting devices for simultaneously actuating the conveying means and the cutting mechanisms, vertically-disposed supplemental clamping and conveying means interposed between the frames, and means for moving or shifting said supplemental means on the base of the machine, substantially as set forth.

7. A dovetailing-machine, comprising a main frame, conveying means carried by said main frame, a supplemental conveyer also carried by said frame, and means for imparting motion to the said conveying means and to the supplemental conveyer, said motion-imparting means comprising a counter-shaft mounted adjacent to the main frame, a second shaft journaled in the main frame, a third or conveyer shaft, power-transmitting devices actuated by the counter-shaft for imparting motion to the second-mentioned shaft, means for transmitting power from the second shaft to the conveyer-shaft, means mounted on the conveyer-shaft for imparting motion to the main conveying means, and gearing on the counter-shaft meshing with gearing on the supplemental conveyer for actuating the latter, substantially as set forth.

8. A dovetailing-machine, comprising a frame, conveying means mounted thereon, and means for imparting motion to said conveying means, such motion-imparting means comprising a power-actuated counter-shaft, a second shaft journaled in the frame, power-transmitting devices connecting the counter-shaft with the said second shaft, a third or conveyer shaft mounted in the frame, means carried by said conveyer-shaft for imparting motion to the conveying means, and devices for imparting motion from the second to the third or conveyer shaft, said means comprising a ratchet-wheel on the conveyer-shaft, a link-carried pawl engaging with said ratchet-wheel, a lever connected with the pawl-link, a second link at the other end of said lever, a tension-spring connected with said lever, and a cam on the second shaft for contacting with the last-mentioned link, the construction being such that the spring and cam will coöperate to rotate the ratchet on the conveyer-shaft.

9. A dovetailing-machine, comprising a frame, conveying devices carried by said frame, cutting mechanism mounted in the frame, means for imparting a rotary motion to the cutting mechanism, and means for imparting a reciprocating motion to said cutting mechanism and simultaneously imparting motion to the conveying means, the last-mentioned motion-imparting means comprising a counter-shaft, a second shaft journaled in the frame, power-transmitting devices connecting the counter-shaft with the second shaft, a sliding bracket carrying the cutting mechanism, cam devices for reciprocating the bracket, a spring-tensioned lever mechanism adapted to impart motion to the conveying means, and a second cam device for actuating the lever mechanism, substantially as set forth.

10. In a dovetailing-machine, the combination of the main frame, a cutting mechanism, a counter-shaft, power-transmitting devices actuated by the counter-shaft for imparting motion to the cutting mechanism, conveying means mounted on the top of said frame, and means for imparting power from the counter-shaft to the conveying means, said power-imparting means comprising a sprocket clutch member loosely mounted on the counter-shaft, a sliding clutch member adapted to rotate with said counter-shaft and be shifted into and out of engagement with the sprocket-clutch, a shaft journaled in the main frame, a sprocket-wheel at the end of said shaft, an endless chain connecting said sprocket-wheel with the sprocket clutch member, a linked lever, and pawl-and-ratchet mechanism interposed between the shaft in the main frame and the conveying means, actuated by the movement of the last-mentioned shaft, for imparting motion to said conveying means.

11. In a dovetailing mechanism, the combination of a base having mounted thereon a stationary member and a movable member, of clamping devices and conveying means mounted on the members, supplemental clamping and conveying means interposed between the members and slidable horizontally relative to the same, a shaft supported by the members and connected with the supplemental conveying means, and power-actuated means mounted in the stationary member, adapted to impart rotary motion to the shaft and thereby drive the supplemental conveying means, substantially as set forth.

12. In a dovetailing-machine, a base portion, a stationary frame and a movable frame mounted on said base portion, clamping devices and conveying means carried by said frame, a supplemental frame mounted on the base portion between the stationary frame and the movable frame, and slidable horizontally relative to said frame, vertically-adjustable standards carried by said supplemental frame, conveying means supported by said standards, and means for simultaneously operating the conveying means of the stationary frame, the movable frame and the supplemental frame, substantially as set forth.

13. In a dovetailing-machine, the combination of a frame, cutting devices mounted thereon, a supplemental frame movable horizontally relative to the first-mentioned frame, vertically-adjustable standards carried by the supplemental frame, horizontally-disposed bars connecting the standards, sprocket-wheels mounted on said bars, and endless lug-carrying chains extending over said sprocket-chains extending over said sprocket-wheels, a shaft journaled in the first-mentioned frame, gearing connecting the shaft with one of the sprocket-wheels, and means on the first-mentioned frame adapted when actuated, to impart a step-by-step rotary motion to the shaft, thereby driving the supplemental conveying-chains through the medium of the sprocket and gearing, substantially as set forth.

14. In a dovetailing-machine, the combination of a frame, cutting mechanism mounted therein, clamping devices and conveying means mounted on the frame, a horizontally-movable supplemental frame, standards mounted on the supplemental frame, horizontally-disposed parallel bars carried at the upper ends of said standards, an endless conveying-chain supported between said parallel bars, and means for vertically adjusting the standards to raise or lower the same relative to the first-mentioned frame, said means comprising screw-threaded rods entering the lower tubular ends of the standards, a gear-wheel mounted on each of said screw-threaded rods, a horizontally-disposed shaft mounted in bearings on the supplemental frame, and provided with gear-wheels at each of its ends corresponding to and meshing with the adjacent gear-wheel on the screw-threaded rod, and means for rotating said shaft, substantially as set forth.

15. In a dovetailing-machine, the combination of a base portion, a movable frame, and a stationary frame thereon, cutting mechanism carried by said frames, a supplemental frame movable horizontally on said base between said frames, vertically-adjustable standards carrying conveying-chains at their upper ends, and means for imparting motion to the conveying-chains, said means comprising a power-actuated counter-shaft and a second shaft, means for transmitting power from the counter-shaft to the second shaft, a third or conveyer shaft adapted to be rotated through the medium of devices connected with the second shaft, and a train of gearing extending from the third or conveyer shaft to the conveying-chain, adapted to impart motion from said shaft to said chain, substantially as set forth.

16. In a dovetailing-machine, the combination of a main frame provided with a slotted top portion, cutting mechanism mounted beneath the main frame and extending through the slotted top portion thereof, conveying means mounted on said top portion above the cutting mechanism, vertically-disposed U-shaped arms or supports mounted on the top portion above the conveying means, a laterally-disposed pressure or clamping bar carried by and interposed between the members of the U-shaped arms, and adjustable relative to a portion of the conveying means, and a second and vertically-disposed clamping or pressure bar also carried by said arms, the vertically-disposed bar being adjustable relative to the top of the main frame, the two bars being adapted to clamp two pieces of stock or material at right angles in the path of the cutting mechanism, substantially as set forth.

17. In a dovetailing-machine, the combination of the main frame, cutting mechanism carried thereby, a driving-spool connected with said cutting mechanism, a counter-shaft located adjacent to the framework, a wheel-pulley on the counter-shaft, a belt connecting the wheel-pulley with the spool on the cutting mechanism for rotating the latter, a shaft extending through the framework of the machine and carrying cam devices contacting with the support for the cutting mechanism, for reciprocating the cutting mechanism when said shaft is operated, and means for imparting motion from the counter-shaft to the shaft mounted in the frame, said means comprising a sprocket clutch member loosely mounted on the counter-shaft, a second clutch member sliding on the counter-shaft and rotatable therewith, a sprocket-wheel on the shaft of the main frame, an endless chain connecting the sprocket-wheel with the sprocket clutch member, and a lever for shifting the revolving clutch member into contact with the sprocket clutch member, substantially as set forth.

18. In a dovetailing-machine, the combination of a base portion, a stationary frame-section mounted thereon, a movable section slidable on the base portion, a supplemental frame also slidably mounted on said base portion, intermediate the aforesaid stationary frame-section and the slidable main-frame section, cutting mechanism carried by the said frame-sections, clamping and conveying devices mounted on said sections, conveying devices mounted on the sliding supplemental frame, and a guide for retaining the ends of the work in position on the supplemental frame, substantially as set forth.

19. In a dovetailing-machine, the combination of a base portion, a main-frame section stationary on the base portion, a second main-frame section slidably mounted on the base portion, cutting mechanism carried by each of the main-frame sections, a supplemental frame mounted on the base portion intermediate the main-frame sections, means for shifting said supplemental frame horizontally, conveying devices carried by said supplemental frame, means for vertically adjusting said conveying devices, and a T-shaped guide for retaining the edges of the work in place when said edges are being supported by and carried on the conveying devices of the supplemental frame, substantially as described.

20. In a dovetailing-machine, a base portion, a stationary frame, and a movable frame slidably mounted thereon, conveying devices carried by said frames, a supplemental conveyer mounted on the frame, movable intermediate the stationary frame and the movable frame, the conveying devices on the stationary and movable frames comprising horizontally-disposed chains extending over sprocket-wheels and spaced apart through the medium of horizontally-disposed bars, the rear end of the bars being slotted, bearing-blocks adjustably mounted in the slotted portions of the bars, carrying the shaft of the rear horizontally-disposed sprocket-wheels, and a set-screw for each of said blocks, the construction and arrangement of the parts being such that the chains of the main conveying devices may be loosened or tightened through the adjustment of the aforesaid blocks in the slotted portions of the bars, substantially as set forth.

In testimony whereof I have signed my name to this specification in the presence of two subscribing witnesses.

JOHN TRUMAN TAYLOR GRIM.

Witnesses:
RALPH WILLARD,
CHARLES S. OFFUTT.